Oct. 1, 1968  C. J. KUGLER  3,404,264
TELEMETERING SYSTEM FOR DETERMINING RATE OF FLOW
Filed July 19, 1965
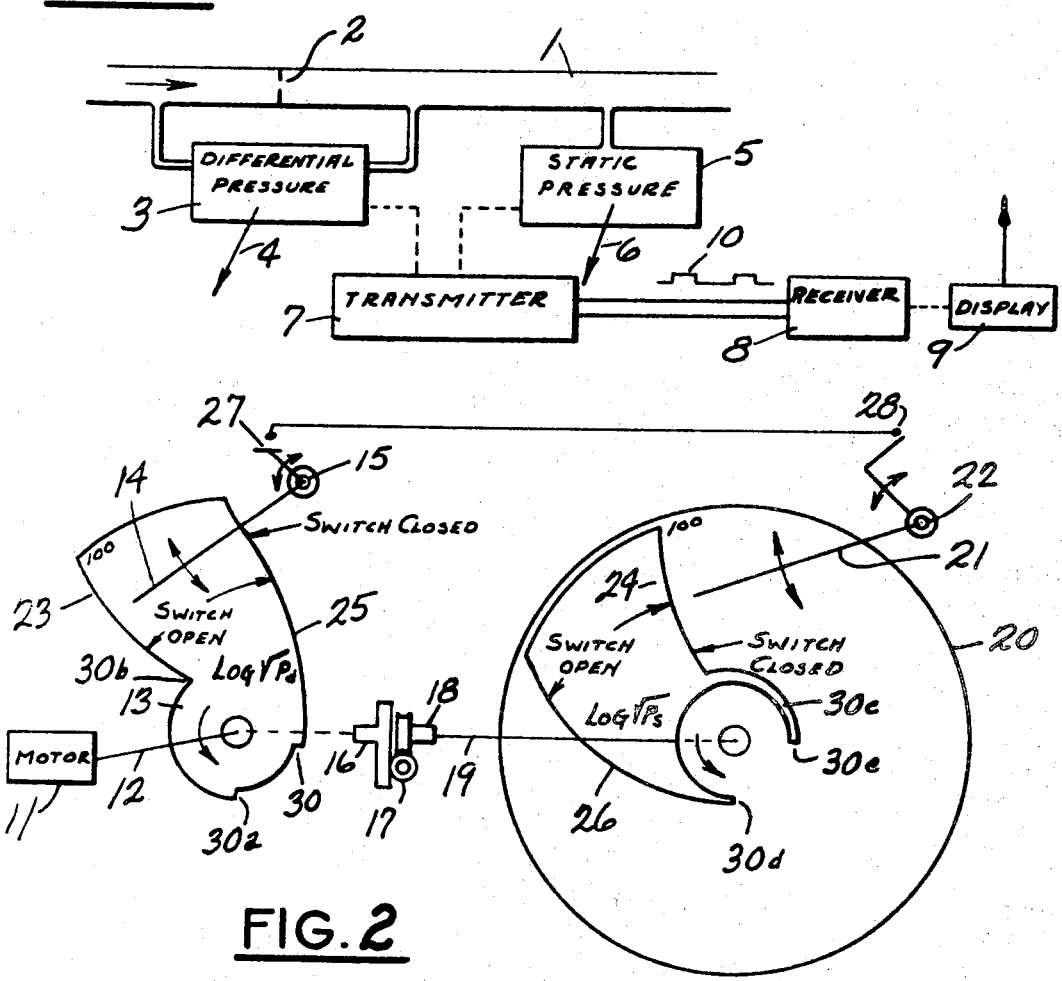
FIG. 1
FIG. 2
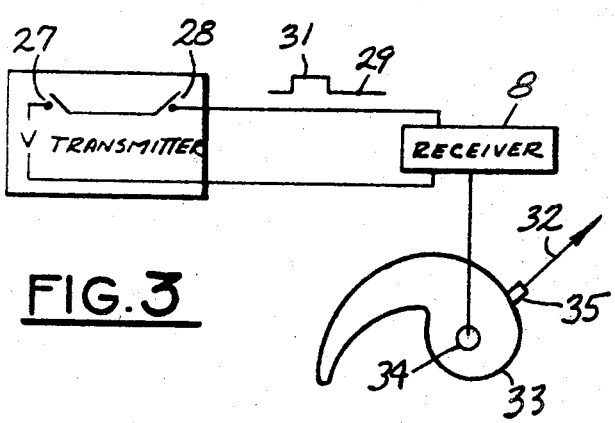
FIG. 3
INVENTOR.
Carl J. Kugler
BY Ralph Hammar
Attorney

United States Patent Office 3,404,264
Patented Oct. 1, 1968

3,404,264
TELEMETERING SYSTEM FOR DETERMINING RATE OF FLOW
Carl J. Kugler, Philadelphia, Pa., assignor to American Meter Company, Incorporated, Philadelphia, Pa., a corporation of Delaware
Filed July 19, 1965, Ser. No. 473,117
8 Claims. (Cl. 235—194)

This invention is a telemetering system for transmitting a pulse of duration proportional to the logarithm of the rate of flow. One use is for gas transmission where the instantaneous rate of flow is equal to a coefficient times the square root of the product of the differential and static pressures.

In the drawing, FIG. 1 is a diagrammatic view of the system used for the measurement of gas flow, FIG. 2 is a diagrammatic view showing the transmitter and operation of the cams for generating the logarithmic pulse proportional to the rate of flow of gas, and FIG. 3 is a circuit diagram.

The rate of flow of gas in line 1 is related to the pressure drop across orifice 2 by the equation $$Q = C\sqrt{P_d \times P_s}$$

which, when expressed in logarithms becomes $$\text{Log } Q = \text{Log } C + \text{Log}\sqrt{P_d} + \text{Log}\sqrt{P_s}$$

or, stated differently, $$\text{Log } Q = \text{Log}\sqrt{P_d} + \text{Log}\sqrt{P_s} - \text{Log } 1/C$$

where Q is the instantaneous rate of flow of gas, C is a coefficient, $P_d$ is the differential pressure across the orifice 2 and $P_s$ is the static pressure in the line.

The differential pressure is readily measured by a suitable differential pressure instrument 3 having a pointer 4 for indicating the instantaneous value. The static pressure is measured by a pressure gauge 5 having a pointer 6. By mechanism to be described, the positions of the pointers 4 and 6 are utilized to transmit the pulse whose duration is the logarithm of the rate of flow. This pulse is transmitted by a transmitter 7 and received by a receiver 8 associated with a display 9. The pulse indicated diagrammatically at 10 repeats at the standard intervals used in telemetering equipment, for example every fifteen seconds.

In the transmitter shown in FIG. 2, a synchronous motor 11 drives a shaft 12 at a constant speed (e.g. 4 r.p.m. for a fifteen second cycle). Fixed on the shaft is a cam 13 associated with a stylus 14 fixed to a rock shaft 15 and having an angular position corresponding to the pointer 4. The shaft 12 drives a hub 16 having a worm and gear connection 17 to a hub 18 fixed to a shaft 19. A cam 20 is fixed to the shaft 19 and is associated with a stylus 21 fixed to a rock shaft 22 and having its angular position corresponding to the pointer 6. The purpose of the worm and gear connection 17 is to permit angular adjustment of the cam 20 relative to the cam 13.

The leading edge 23 of the cam 13 is cut in an arc centered on the rock shaft 15. The leading edge 24 of the cam 20 is similarly cut on an arc centered on the rock shaft 22. The trailing edge 25 of cam 13 is cut on the logarithm of the differential pressure. The trailing edge 26 of the cam 20 is cut on the logarithm of the static pressure. While the stylus 14 is between the leading and trailing edges 23, 25 of the cam 13, a switch 27 is open.

If there is no flow and the differential pressure is zero, the switch 27 should be open. This is accomplished by the arcuate section of cam 13 between points 30b and 30a. Whenever the stylus 14 drops off the cam 13, the switch 27 is closed. Even at zero flow, the switch 27 must be closed when the stylus drops into the cut out section between numerals 30 and 30a. While the stylus 21 is in the depressed section between the leading edge 24 and the trailing edge 26 of the cam 20, a switch 28 is open. At zero static pressure, no signal should be transmitted and switch 28 should be held open. This is accomplished by groove 30c. Regardless of the static pressure, switch 28 must be closed between points 30d and 30e corresponding to points 30 and 30a on cam 13. In summary, switch 27 is open whenever the stylus 14 rides on cam 13; switch 27 must be closed between points 30 and 30a; the length of time switch 27 is closed depends upon the rate of flow. Switch 28 is open whenever stylus 21 is in the depressed section of cam 20, i.e. groove 30c and the area between lines 24 and 26; switch 28 must be closed between points 30d and 30e; at all other times switch 28 is closed. As shown diagrammatically in FIG. 3, when switches 27 and 28 are both open, no current flows. When both switches 27 and 28 are closed (the interval between the time stylus 14 drops off edge 25 and stylus 21 drops off edge 24) the current flow to the receiver is at the higher level indicated by 31. The duration of the pulse 31 is equal to the sum of the logarithm of the square root of the differential pressure ($\text{Log}\sqrt{P_d}$) plus the logarithm of the square root of the static pressure ($\text{Log}\sqrt{P_s}$) plus an interval between points 30 and 30a (e.g. 3 seconds) during which current always flows. This interval establishes a "live zero" or a minimum indication corresponding to zero. When the cams operate on a 15 second cycle, the minimum pulse will be of 3 seconds duration and will correspond to Q equals zero and the maximum pulse will be of 12 seconds duration and will correspond to a full scale.

By shifting the position of the cams 20 and 14 by means of the worm and gear adjustment 17, it is possible to have the duration of the pulse 31 equal to the logarithm of the instantaneous flow. This is done in accordance with the equation $$\text{Log } Q = \text{Log}\sqrt{P_d} + \text{Log}\sqrt{P_s} - \text{Log } 1/C$$

Since the coefficient C is usually a fixed quantity for any particular installation, once the adjustment is made, the instrument can run continuously until a new setting is required.

The receiver for decoding the information received from the pulses 31 may be a standard 15 second cycle, Bristol Metameter Receiver unit. This receiver drives a pen arm 32 up and down the scale in accordance with the length of the pulse 31. Since the pulse length is logarithmic, a decoding cam 33 is fixed to the output shaft 34 of the receiver and a follower 35 on the pen arm rides on the logarithmic profile of the cam 33, thereby providing a linear display.

What is claimed as new is:
1. A telemetering system comprising a first stylus positioned in accordance with the value of a first quantity, a first switch actuated by the first stylus, a second stylus positioned in accordance with the value of a second quantity, a second switch actuated by the second stylus, first and second cams rotated at a synchronous speed, said first cam cooperating with the first stylus and having a logarithmic surface whereby the first switch is actuated for a first interval corresponding to the logarithm of the first quantity, said second cam having a logarithmic surface cooperating with the second stylus whereby the second switch is actuated for a second interval corresponding to the logarithm of the second quantity, means positioning said cams so said first and second intervals are in additive relation and the total interval corresponds to the logarithm of the first and second quantities plus the logarithm of a third quantity, and means for generating a pulse of duration proportional to said total interval and corresponding to the product of the first, second, and third quantities.

2. A telemetering system comprising a first stylus positioned in accordance with the value of a first quantity, a first switch actuated by the first stylus, a second stylus positioned in accordance with the value of a second quantity, a second switch actuated by the second stylus, first and second cams rotated at a synchronous speed, said first cam cooperating with the first stylus and having a logarithmic surface whereby the first switch is actuated for a first interval corresponding to the logarithm of the first quantity, said second cam having a logarithmc surface cooperating with the second stylus whereby the second switch is actuated for a second interval corresponding to the logarithm of the second quantity, and means for generating a pulse of duration proportional to the sum of said first and second intervals.

3. A telemetering system comprising a first stylus positioned in accordance with the value of a first quantity, a second stylus positioned in accordance with the value of a second quantity, first and second cams rotated at a synchronous speed, said first cam cooperating with the first stylus and having a logarithmic surface actuating the first stylus for an interval corresponding to the logarithm of the first quantity, said second cam having a logarithmic surface cooperating with the second stylus actuating the second stylus for an interval corresponding to the logarithm of the second quantity, and means for generating a pulse of duration proportional to the sum of said intervals.

4. A telemetering system comprising a first stylus positioned in accordance with the value of a first quantity, a first switch closed by the first stylus, a second stylus positioned in accordance with the value of a second quantity, a second switch closed by the second stylus, first and second cams rotated at a synchronous speed, said first cam cooperating with the first stylus and having a logarithmic surface whereby the first switch is closed for an interval corresponding to the logarithm of the first quantity, said second cam having a logarithmic surface cooperating with the second stylus whereby the second switch is closed for an interval corresponding to the logarithm of the second quantity, means positioning said cams so said intervals are in additive relation, and a source of voltage in series with said switches for generating a pulse of duration proportional to the sum of said intervals.

5. A telemetering system comprising a first stylus positioned in accordance with the value of a first quantity, a first switch actuated by the first stylus, a second stylus positioned in accordance with the value of a second quantity, a second switch actuated by the second stylus, first and second cams rotated at a synchronous speed, said first cam cooperating with the first stylus and having a logarithmic surface whereby the first switch is actuated for a first interval corresponding to the logarithm of the first quantity whenever the first quantity is in excess of zero, said second cam having a logarithmic surface cooperating with the second stylus whereby the second switch is actuated for a second interval corresponding to the logarithm of the second quantity, means positioning said cams so said first and second intervals are in additive relation and the total interval corresponds to the logarithm of the first and second quantities plus the logarithm of a third quantity, and means for generating a pulse of duration proportional to said total interval and corresponding to the product of the first, second, and third quantities.

6. A telemetering system comprising a first stylus positioned in accordance with the value of a first quantity, a first switch actuated by the first stylus, a second stylus positioned in accordance with the value of a second quantity, a second switch actuated by the second stylus, first and second cams rotated at a synchronous speed, said first cam cooperating with the first stylus and having a logarithmic surface whereby the first switch is actuated for a first interval corresponding to the logarithm of the first quantity whenever the first quantity is in excess of zero, said first cam having a further surface for actuating said first switch for a fixed interval at the end of said first interval regardless of the value of the first quantity, said second cam having a logarithmic surface cooperating with the second stylus whereby the second switch is actuated for a second interval corresponding to the logarithm of the second quantity, said second cam having a further surface for actuating said second switch for a fixed interval coincident with said first fixed interval regardless of the value of the second quantity, and means for generating a pulse of duration proportional to the sum of said first and second intervals plus said fixed interval.

7. The system of claim 6 having means for adjusting the relative position of said cams to vary said fixed interval in accordance with the logarithm of a third quantity.

8. A telemetering system comprising a first stylus positioned in accordance with the value of a first quantity, a second stylus positioned in accordance with the value of a second quantity, first and second cams rotated at a synchronous speed, said first cam cooperating with the first stylus and having a logarithmic surface actuating the first stylus for an interval corresponding to the logarithm of the first quantity whenever said first quantity is greater than zero, said second cam having a logarithmic surface cooperating with the second stylus actuating the second stylus for an interval corresponding to the logarithm of the second quantity, and means for generating a pulse of duration proportional to the sum of said intervals plus an additional interval proportional to the logarithm of a third quantity.

References Cited

UNITED STATES PATENTS

| | | | |
|---|---|---|---|
| 2,985,013 | 5/1961 | Yeager et al. | 235—151.3 X |
| 3,002,382 | 10/1961 | Gardner | 235—151.3 X |
| 3,173,003 | 3/1965 | Muller-Girard | 235—193 |

MALCOLM A. MORRISON, *Primary Examiner.*

J. A. RUGGIERO, *Assistant Examiner.*